(12) United States Patent
Dean

(10) Patent No.: US 6,287,474 B1
(45) Date of Patent: *Sep. 11, 2001

(54) LIQUID TREATMENT MEDIA REGENERATION APPARATUS AND PROCESS

(75) Inventor: Irving A. Dean, Canton, MI (US)

(73) Assignee: Filtra-Systems Company, Farmington Hills, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,595

(22) Filed: Jul. 27, 1998

(51) Int. Cl.[7] ............................. B01D 37/00; B01D 24/46
(52) U.S. Cl. ......................... 210/796; 210/276; 210/280; 210/414; 210/415
(58) Field of Search .................................. 210/276, 280, 210/269, 792, 793, 795, 796, 414, 415

(56) References Cited

U.S. PATENT DOCUMENTS

| 632,091 | * | 8/1899 | Bommarius | 210/276 |
| 748,857 | * | 1/1904 | Goade | 210/276 |
| 4,496,464 | * | 1/1985 | Hensley | 210/269 |
| 5,171,443 | * | 12/1992 | Bratten | 210/280 |
| 5,445,740 | * | 8/1995 | Malone | 210/280 |

* cited by examiner

Primary Examiner—Robert J. Popovics
(74) Attorney, Agent, or Firm—John R. Benefiel

(57) ABSTRACT

A deep bed liquid treatment apparatus and process in which the liquid and a granular media is periodically agitated to create a liquid-media slurry, and outflow of the liquid and entrained contaminants is induced through a separator having an inner diameter screen with openings sufficiently small to prevent the escape of media granules. A rotor is rotated within the separator to create turbulent flow at the screen to dislodge the granules drawn onto the screen openings.

20 Claims, 2 Drawing Sheets

LIQUID TREATMENT MEDIA REGENERATION APPARATUS AND PROCESS

BACKGROUND OF THE INVENTION

This invention concerns liquid treatment, and more particularly liquid treatment apparatus using granular media such as deep bed filters or deionizers, the bed of granular media disposed in a tank through which is passed a liquid to be treated thereby.

In filters, the media must be cleaned periodically to remove accumulated filtered solids, as by backwashing the bed. This is also required in demineralizing apparatus where resin beads must be backwashed preparatory to brining the resin beads to reactivate the same. Backwashing can cause the loss of media if a too vigorous outflow is set up, but this limits the effectiveness of the cleaning of the media, which otherwise gradually becomes less effective.

U.S. Pat. No. 5,171,443 issued on Dec. 15, 1992 describes an improved regeneration process and system, particularly suited for filters using lightweight media such as crushed black walnut shells, but which is also applicable to deionizers. In that process and system the liquid and media are vigorously agitated to form a slurry, and the liquid and contaminants are caused to flow out through openings in a separator, the openings sized to block the escape of media granules.

In that process and system, the separator is a hollow cylindrical structure which is rotated within the slurry of liquid and media. The rotation of the separator prevents the media from clogging the separator strainer openings as the liquid flow draws the media against the openings, since the granules in suspension impact and dislodge the granules drawn against the separator openings.

This arrangement has worked very well and that design has been quite successful.

However, the need to rotate the separator necessitates the use of relatively costly seals, and also requires a significantly more powerful drive motor than that required to simply agitate the liquid, increasing the cost to manufacture and operate the apparatus.

It is the object of the present invention to provide a regeneration process and system for liquid treatment apparatus media which provides many of the advantages of the rotating separator design, but at a lower cost.

SUMMARY OF THE INVENTION

The above recited object is achieved by providing an annular, stationary separator having an inner diameter surface defined by a screen formed with an array of strainer openings. An auxiliary rotor is disposed within the inside diameter of the separator with tips thereof closely spaced to the surface of the screens The auxiliary rotor is rotated so as to create turbulence at the surface of the screen, causing the media granules in the slurry to be directed at the inner diameter surface, tending to dislodge any media granules which have been drawn onto the openings by the cleaning outflow through the separator during backwashing. The slurry may be formed by mechanical agitation, and in this case an agitator impeller may be driven by the same rotating shaft as the auxiliary rotor within the separator, or the auxiliary rotor may itself also act as a mechanical agitator forming the slurry.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
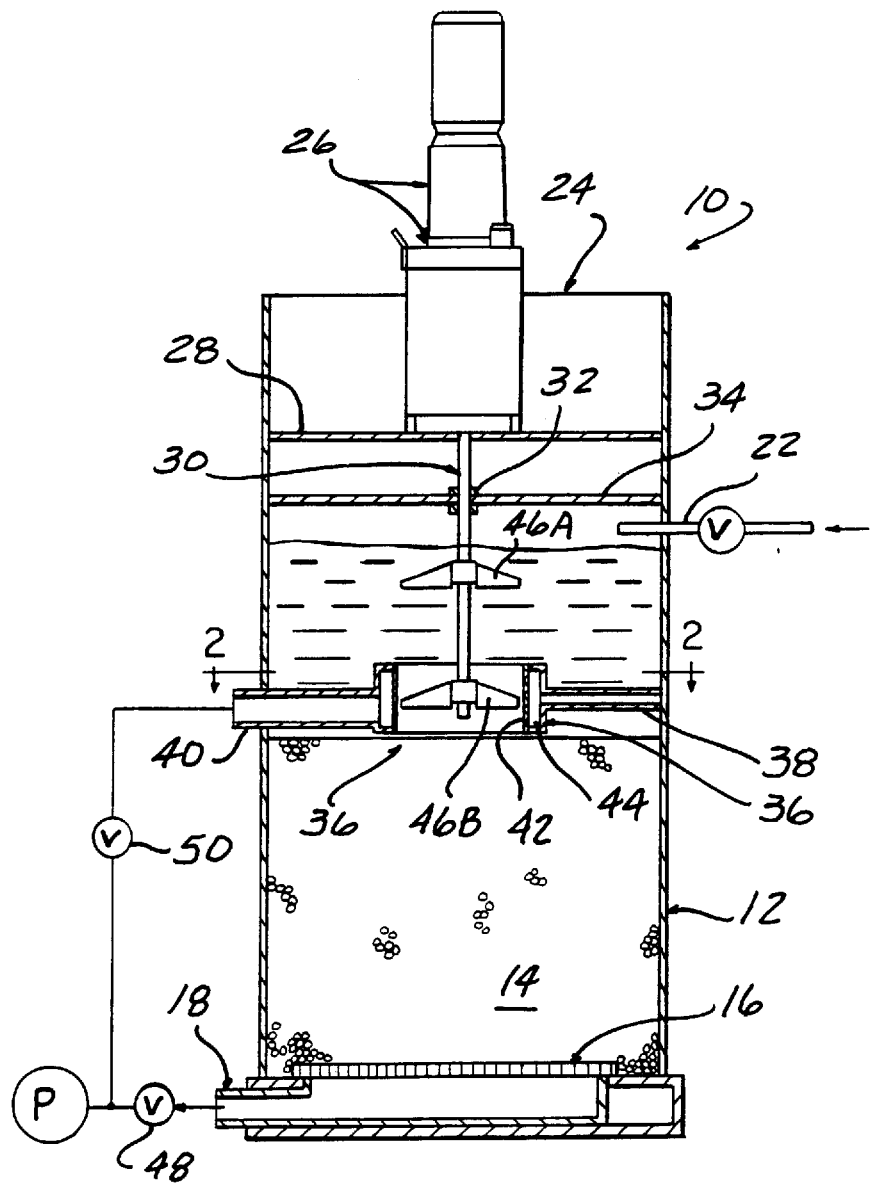
FIG. 1 is a diagrammatic representation of a deep bed filter incorporating a regeneration system according to the present invention.

Referring to FIG. 1, a deep bed filter 10 is depicted diagrammatically, which includes a tank 12 defining an internal space containing a volume of granular filter media such as walnut shells or plastic beads of a predetermined uniform size forming a deep bed 14 in the lower region of the tank 12.

The media bed 14 is supported on a discharge grating 16 at the bottom of the tank 12, the grating 16 having openings sufficiently small to prevent the particular size of media granules from passing out to an outlet 18. A wedgewire grate is preferred as described in the above referenced patent.

A pump 20 may be connected to the outlet 18 to create a vacuum drawing liquid to be filtered from the tank 12 through the media bed 14. Alternatively, a gravity feed may be used. Liquid to be filtered is directed into the upper region of the tank 12 via an inlet pipe 22.

According to the basic invention as described in U.S. Pat. No. 5,171,443 referenced above, in order to regenerate the media bed 14, an agitator apparatus 24 is provided, periodically operated to agitate the liquid and media to create a slurry composed of the liquid and the granular media. The agitator apparatus 24 includes an electric motor drive unit 26 supported on a top wall 28 of the tank 12. The drive unit 26 rotates a downwardly extending shaft 30, which may also have an intermediate bearing support 32 on a partition 34.

Figure 2:
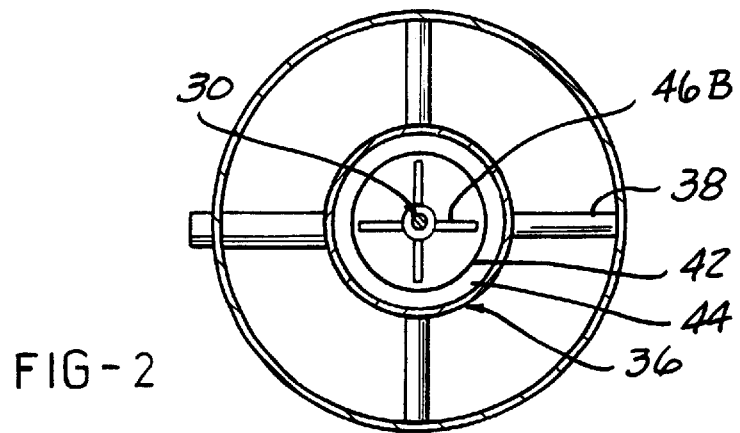
FIG. 2 is a view of the section 2—2 taken in FIG. 1A.

A fixed annular separator 36 is mounted within the tank 12 at a central location (FIG. 2), supported on struts 38 and, outlet pipe 40.

The inner diameter surface of the separator 36 is defined by a cylindrical screen 42 constructed with openings smaller than the size of the granular media. A wedgewire construction is preferred, as described in U.S. Pat. No. 5,171,443, in which tapered wires are welded to inner supports to form slits of sufficiently narrow width to prevent the escape of the media granules, but typically slightly larger than the openings of the grating 16 to allow media fragments to be eliminated during regeneration. An annular collector space 44 receives liquids and suspended contaminants passing out through the screen 42.

The annular separator is fixed within the tank 12, attached to struts 38 and an outlet pipe 40, which opens into the collector space 44.

The agitator apparatus 24 includes a pair of axially spaced sets of rotors 46A, 46B attached to the shaft.

Figure 4:
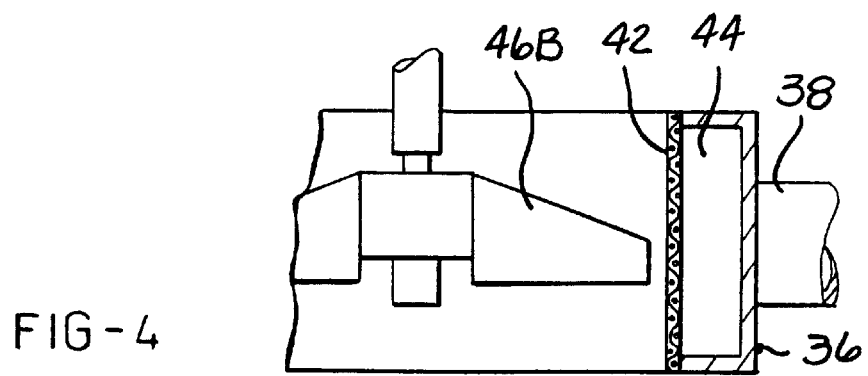
FIG. 4 is an enlarged partially sectional.
Figure 3:
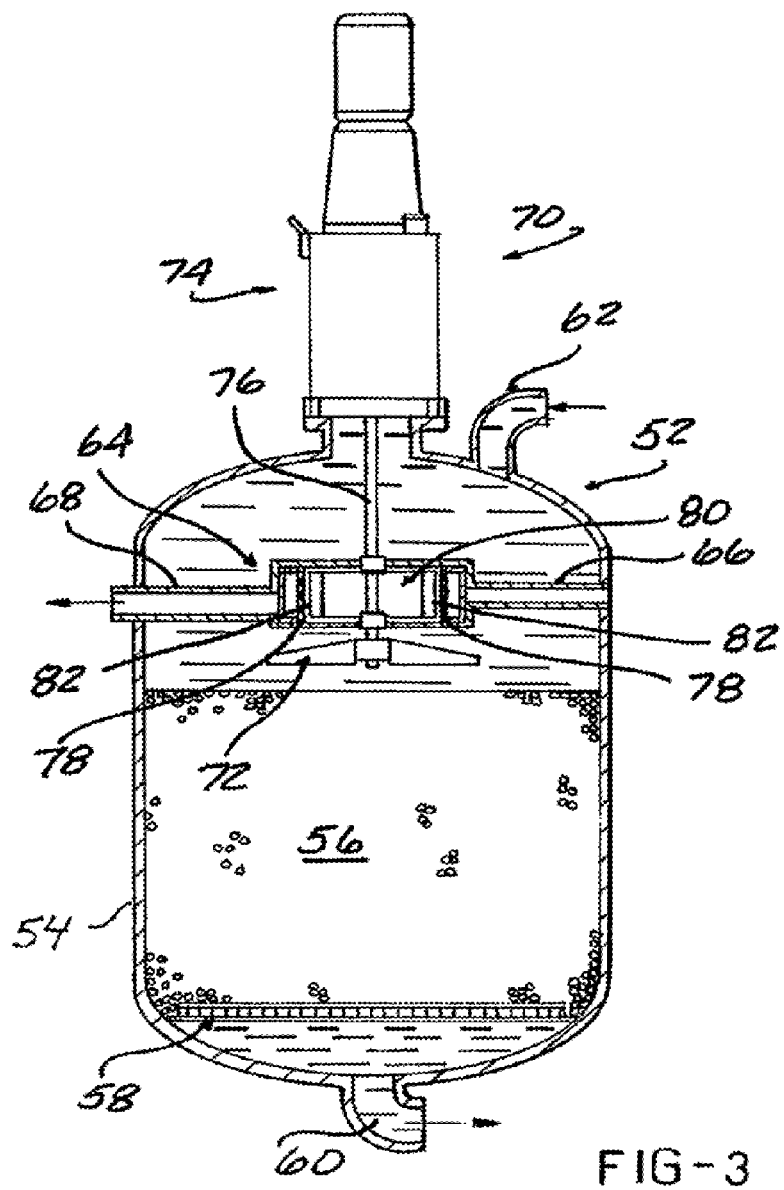
Figure 4:
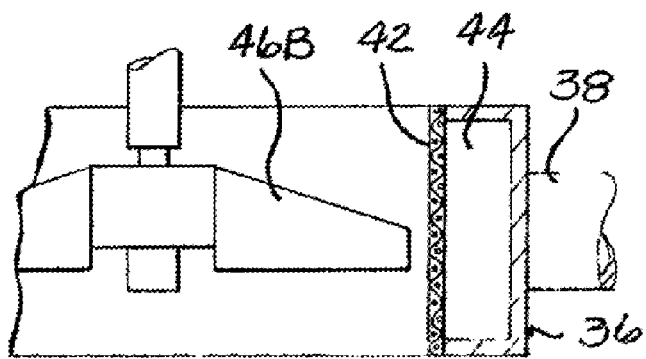
Figure 1:
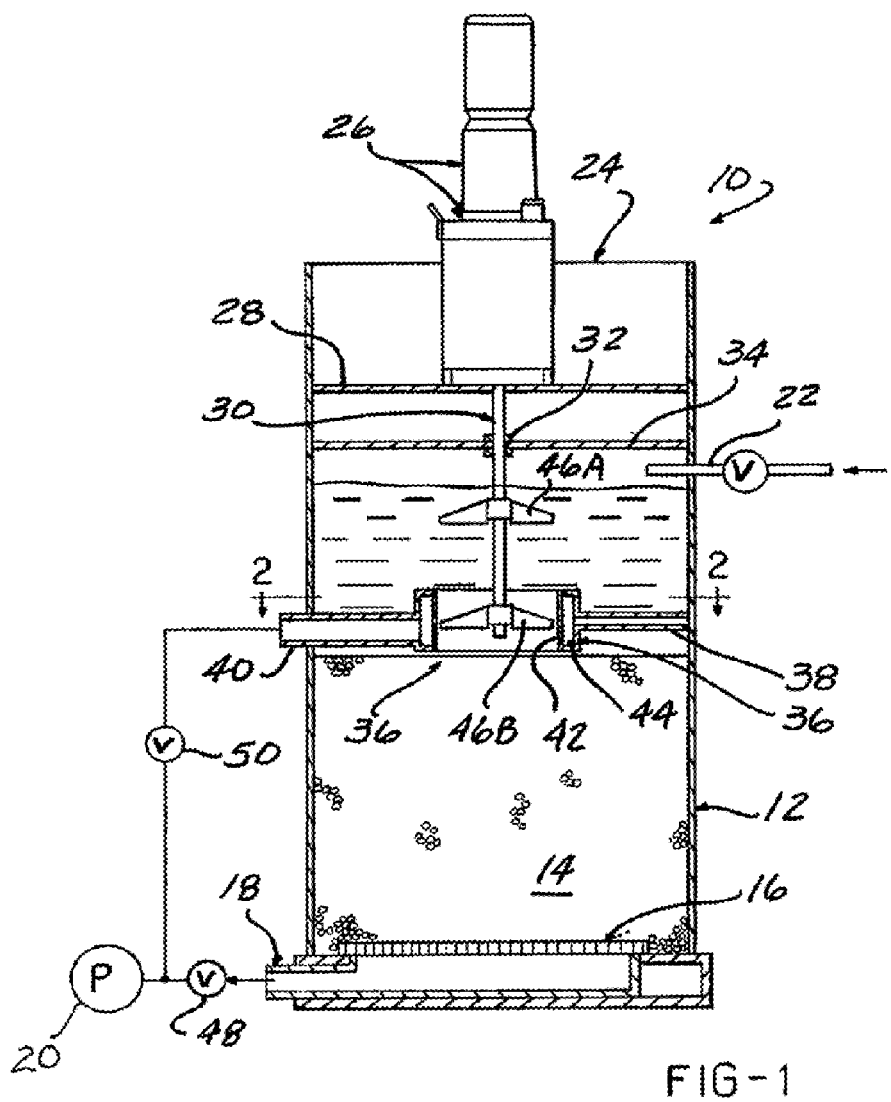
Figure 2:
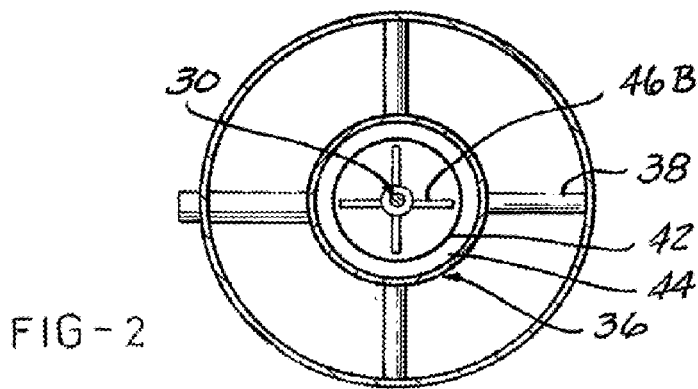

The lower rotor 46B is received within the inside diameter of the separator 36 with the tips thereof closely spaced to the surface 42 (FIG. 4). This spacing is sufficient to insure clearance as the rotor rotates but close enough to create sufficient turbulence at the surface of the screen 42 to dislodge the media granules.

The rotors 46A, 46B have downwardly facing impeller blade sets which when rotated at a sufficient velocity sets up a vertical recirculation, agitating the liquid and media, and causing a slurry to be formed of the liquid and media granules. During regeneration, the pump valve 48 is closed, and a backwash valve 50 is opened, causing the liquid and entrained contaminants to be drawn off through regeneration outlet 40. A make-up inflow of liquid is introduced via inlet pipe 22. The turbulence formed at the tips of the impeller blades of the lower rotor 46B causes the suspended granules to be forcefully directed at the granules drawn against the slits or openings in the screen 42, dislodging them to keep the granules cleared from the openings. This prevents a flow clogging buildup which otherwise would occur.

As described in the above referenced patent, a speed of 15 feet per second at the surface of the screen was found adequate to keep the openings clear. The turbulence formed by eddy currents at the rotor tips may reduce the surface velocity required.

In this arrangement, rotary seals and bearings for the separator 36 are not required, nor is a larger motor to rotate the separator 36, and hence the apparatus can be constructed at a lower cost.

After regeneration, the media is allowed to resettle prior to start up of the filter so that the media is not drawn to the grating openings and blocking the same.

Figure 3:
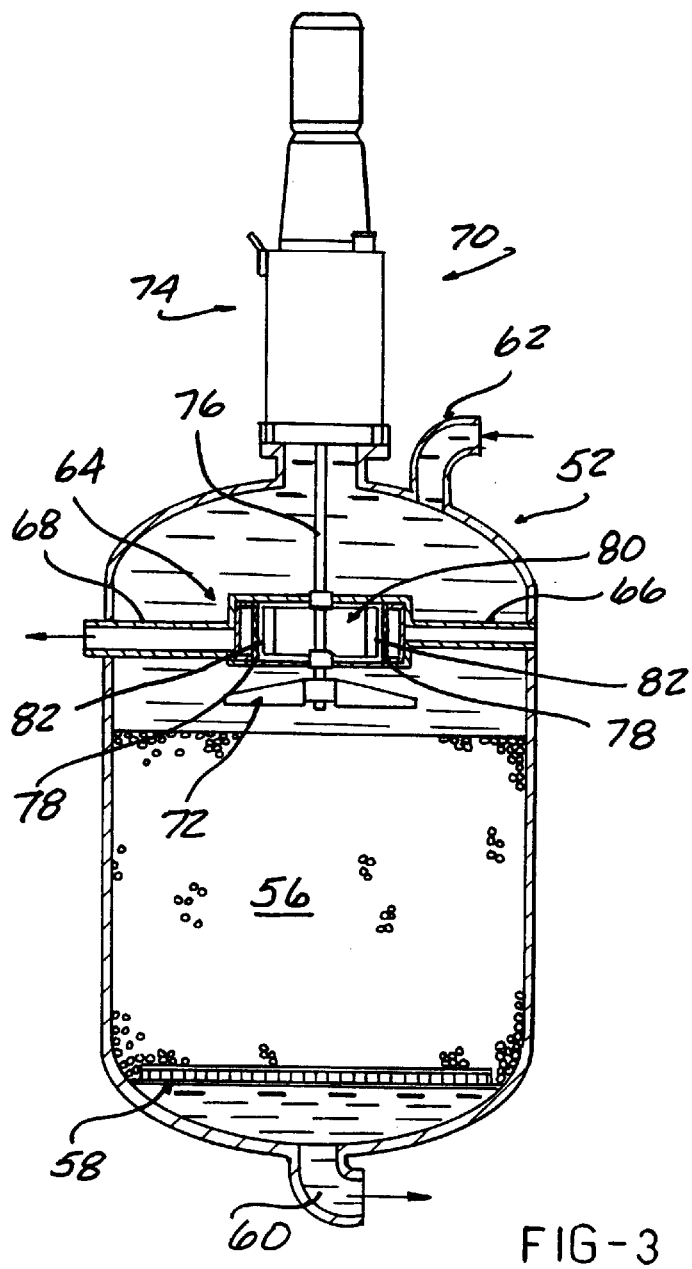
FIG. 3 is a diagrammatic representation of a filter incorporating an alternate embodiment of the regeneration system according to the invention.

FIG. 3 shows a pressurized deep bed liquid treatment apparatus 52, such as a deionizer in which a closed pressurized tank 54 contains a media bed 56 resting on a grating 58 over a central outlet 60. Liquid is directed under pressure into the tank interior through an inlet 62.

As before, an annular separator 64 is fixedly supported centrally within the tank 54, above the media bed 56, by a series of struts 66 and an outlet pipe 68.

As before, an agitator apparatus 70 has a rotor-impeller 72 driven by a drive unit 74 and shaft 76.

In this embodiment, the rotor impeller 72 is of larger diameter and is located below the separator 64 to enable agitation sufficient to form a slurry with the single rotor impeller 72.

An auxiliary rotor 80 comprised of a set of four square edged blades each having an outer blade portion 82 are located with the blade edge closely adjacent the surface of the inner cylindrical screen 78 of the separator 64. The blade edges 76 sweep over the area just inside the surface of the screen 78 to create turbulence and a tangential flow tending to dislodge any granules drawn to the screen openings, and thereby keep the screen 78 openings clear of media granules, as in the above described embodiment.

The liquid treatment apparatus 52 can comprise a filtering and/or a demineralizing or deionizing water treatment system, as described above.

What is claimed is:

1. A deep bed filter comprising:
   a tank defining an internal space for containing a liquid to be filtered, and an inlet for directing liquid to be filtered into said tank;
   a bed of granular filter media disposed in said tank occupying a portion of the internal space in said tank;
   an outlet receiving a flow of filtered liquid after passing through said media bed;
   at least one agitator element mounted within said tank space;
   periodically operated drive means for causing said agitator element to be moved so as to cause dispersal of said filter media and liquid within said tank space to form a slurry mixture of said liquid and said granular media;
   an annular separator having an inner cylindrical screen having flow openings formed therein smaller than the size of said granular filter media to prevent said granular media flow from passing therethrough while allowing flow therethrough of filtered solids dispersed into said liquid by agitation set up by said movement of said agitator element within said tank, said annular separator mounted to be stationary within said tank;
   outlet means drawing liquid out through said separator flow openings and into an annular space within said separator, and out of said tank; and
   means for creating localized liquid flow at the surface of said inner cylindrical screen of said annular separator directing dispersed media at said screen surface so as to dislodge granular media drawn onto said flow openings during outflow of liquid through said openings, said means for creating localized flow comprising a rotor mounted to be rotated within said separator inner wall to create turbulence at said separator inner cylindrical screen, said means for rotating said agitator element also rotating said rotor.

2. The filter according to claim 1 wherein said means for moving said agitator element comprises means for continuously rotating said agitator element about a central axis of said separator.

3. The filter according to claim 1 wherein said agitator element comprises at least one impeller mounted to be rotated by said drive means.

4. The filter according to claim 1 wherein said drive means includes a shaft extending downwardly into said tank space to suspend said rotor within said annular separator.

5. The filter according to claim 4 wherein said agitator element is mounted beneath said separator and above said filter media bed.

6. The filter according to claim 4 wherein said at least one agitator element comprises an impeller mounted above said separator rotor.

7. The filter according to claim 1 wherein said filter tank is closed to the atmosphere and pressurized during filtering of said liquid.

8. The filter according to claim 1 wherein said filter tank is open to the atmosphere during filtering of said liquid.

9. A filtering process for removing contaminants suspended in a liquid to be filtered, comprising the steps of:
   disposing a bed of granular filter media in a tank so as to form a deep bed filter;
   passing liquid through said bed of granular media to remove said contaminants therefrom;
   collecting filtered liquid passed through said bed and directing the same out of said tank for use;
   periodically interrupting filtering of said liquid to remove accumulated contaminants from said granular filter media, by a cleaning process comprising the steps of agitating liquid and filter media in said tank to form a slurry of liquid and dispersed filter media granules;
   circulating said slurry over a separator fixedly mounted in said tank and having a wall formed with flow openings sized smaller than the size of said filter media granules to prevent escape of filter media therethrough while allowing outflow of liquid and contaminants therethrough;
   inducing an outflow of liquid and contaminants out of said tank through said separator openings;
   maintaining a localized flow of said liquid at said separator wall to continuously dislodge filter media granules drawn against said separator openings by said liquid outflow;

said step of maintaining a localized flow comprising the steps of configuring said separator wall as a cylinder and rotating a rotor within said cylinder, with an outer perimeter closely spaced from said wall to create turbulent flow at the tips.

10. The filter process according to claim 9 wherein said step of forming a liquid-filter media granule slurry comprises the step of mechanically agitating said mixture by moving an agitator element within said liquid to set up a vertical circulation thereof.

11. The filter process according to claim 10 wherein said mechanical agitation step comprises the step of rotating an impeller comprising said agitator element within said liquid in said tank to create said slurry.

12. The filter process according to claim 11 further including the step of driving said impeller and said rotor with a common shaft.

13. The filter process according to claim 11 further including the step of facing said impeller downwardly in said tank to cause a downward circulation of liquid into said filter bed upon rotation of said impeller.

14. The filter process according to claim 9 wherein said filter openings comprise parallel slits and wherein in said step of moving said separator element, said separator element is moved in a direction across said slits to produce said turbulence.

15. A process for separating granular media used in a liquid treatment apparatus from the treated liquid in a tank, said granular media being of a predetermined size, comprising the steps of:

dispersing said granular media into said liquid to form a slurry;

drawing said liquid out of said slurry through a separator along which said granular media in said slurry is circulated, said separator having a surface formed with flow openings of a smaller size than the granules making up said granular media to prevent escape of said granular media circulated along said separator;

establishing a localized turbulent outward flow of said liquid directing granular media by movement of an agitator element closely spaced to the surface of said separator while maintaining said separator stationary within said tank; and, dislodging any granular media granules drawn to said openings by impacting granules drawn to said openings with other granules in said slurry by the force of said localized turbulent outward flow.

16. The process according to claim 15 wherein said step of dispersing said granular media comprises the step of establishing a vertical recirculating flow of said liquid and granular media in said tank.

17. The process according to claim 16 wherein said vertical flow establishing step comprises the step of rotating one or more rotors in said tank.

18. The process according to claim 17 wherein in said steps of rotating said one or more and establishing an outward turbulent flow at said separator surface are carried out together simultaneously.

19. Apparatus for treatment of a liquid comprising: a tank having a space adapted to receive said liquid to be treated;

a bed of granular material utilized in said liquid treatment disposed in said tank space, said granular material comprised of granules of a predetermined minimum size;

an outlet for allowing removal of liquid from said tank;

a separator fixedly mounted in said tank and formed with a surface having flow openings therein of smaller size than said granules of said granular material;

means for drawing liquid in said tank space through said separator flow openings and out through said outlet;

agitator means for maintaining a dispersal of said granular material in said liquid to cause granules to be drawn against said fixed separator surface while said liquid is being drawn off; and, an agitator element having a portion closely spaced to said fixed separator surface and movable to establish an outward turbulent flow of liquid and granules at said fixed separator surface while said liquid is being drawn therethrough, said turbulent flow at said separator surface sufficiently forceful to dislodge said granules drawn to said fixed separator surface, whereby said openings in said separator are kept clear of said granules.

20. The apparatus for treatment of a liquid according to claim 19 wherein said agitator element comprises an agitator impeller rotated in said tank driven by drive means, said impeller having blades with tips closely spaced to said separator surface to establish an outward turbulent flow directed at said separator surface.

* * * * *

UNITED STATES PATENT AND TRADEMARK OFFICE
CERTIFICATE OF CORRECTION

PATENT NO. : 6,287,474 B1
DATED : September 11, 2001
INVENTOR(S) : Irving A. Dean Page 1 of 1

It is certified that error appears in the above-identified patent and that said Letters Patent is hereby corrected as shown below:

<u>Column 1,</u>
Line 52, delete "screens" insert therefore -- screen. --.

<u>Column 2,</u>
Line 29, after "vacuum" insert -- , --.

Signed and Sealed this

Twelfth Day of March, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO. : 6,287,474 B1 Page 1 of 3
APPLICATION NO. : 09/123595
DATED : September 11, 2001
INVENTOR(S) : Irving A. Dean It is certified that error appears in the above-identified patent and that said Letters Patent is hereby corrected as shown below:

Drawing Figure 1 is missing corresponding reference number 20.

Drawing Figure 3 is missing corresponding reference number 54.

Please see attached drawings and please insert

Signed and Sealed this

Twenty-ninth Day of May, 2007

JON W. DUDAS
*Director of the United States Patent and Trademark Office*